United States Patent [19]

Ayama et al.

[11] Patent Number: 4,937,304
[45] Date of Patent: Jun. 26, 1990

[54] NEW POLYSILAZANE AND PROCESS FOR PRODUCTION OF THE SAME

[75] Inventors: Koichi Ayama; Kaneo Noake, both of Minamata; Tamio Serita, Chiba, all of Japan

[73] Assignee: Chisso Corporation, Japan

[21] Appl. No.: 205,278

[22] Filed: Jun. 10, 1988

[30] Foreign Application Priority Data

Jun. 12, 1987 [JP] Japan ................. 62-146658

[51] Int. Cl.$^5$ ............................. C08G 77/04
[52] U.S. Cl. ...................... 528/34; 528/28; 528/38; 528/33
[58] Field of Search .............. 528/28, 34, 38, 33

[56] References Cited

U.S. PATENT DOCUMENTS

| | | | |
|---|---|---|---|
| 2,564,674 | 8/1951 | Cheronis | 260/448.2 |
| 2,579,418 | 12/1951 | Cheronis | 260/2 |
| 3,036,019 | 5/1962 | Molotsky | 260/2 |
| 3,143,514 | 8/1964 | Boyer | 260/2 |
| 4,255,549 | 3/1981 | Christophliemk et al. | 528/28 |
| 4,482,669 | 11/1984 | Seyferth et al. | 524/442 |

FOREIGN PATENT DOCUMENTS 60-226890 11/1985 Japan .

Primary Examiner—Melvyn I. Marquis
Attorney, Agent, or Firm—Leydig, Voit & Mayer

[57] ABSTRACT

There is provided a new polysilazane product from a specific precursor. Desired molecular weight of the polysilazane can be obtained by selecting proper amount of a silazane or silylamine compound

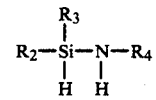

as an additive. The polysilazane is stable during storage without gelation. The polymerization of the precursor can be carried out without gelation even at a high temperature and hence can be completed in a short time. The polysilazane can be made into ceramics fiber by spinning from a solution and subsequent firing.

7 Claims, No Drawings

NEW POLYSILAZANE AND PROCESS FOR PRODUCTION OF THE SAME

BACKGROUND OF THE INVENTION

1. Field of the Invention:

The present invention relates to a new polysilazane useful for the production of $Si_3N_4/SiC$ ceramics, a molded article produced from said polysilazane, a process for producing said polysilazane, and a process for pyrolyzing said polysilazane into a ceramic material.

2. Description of the Prior Art:

Nowadays, silicon nitride, silicon carbide, and a mixture thereof are attracting considerable attention as ceramics materials. Research is being carried out to produce such ceramics materials, especially ceramic fiber, by pyrolyzing a polysilazane whose main chain is composed of nitrogen and silicon. According to known technology disclosed in Japanese Patent Laid-open No. 226890/1985, an organic silazane polymer is produced by reacting anhydrous ammonia with $RSiHX_2$ in solution, thereby forming a cyclic or linear precursor, and reacting this precursor in the presence of a basic catalyst capable of deprotonating hydrogen from a nitrogen atom adjacent to a silicon atom, thereby forming the $Si_2N_2$ bridge. This procedure is accomplished by, for example, blowing ammonia gas into methyldichlorosilane cooled in diethyl ether to bring about ammonolysis, filtering off the resulting ammonium chloride precipitates, and distilling away ether from the filtrate under reduced pressure, thereby obtaining a precursor having the skeletal repeating unit of the formula:

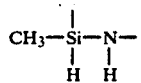

Having a number-average molecular weight of about 300, this precursor is considered to be a cyclic compound composed of about 5 skeletal repeating units. This precursor polymerizes, giving off hydrogen gas, when added, with stirring, dropwise to a tetrahydrofuran solution in which is suspended potassium hydride (KH). This is elucidated as follows by the inventors, Seyferth et al.

At first, the following reaction forms the amide functional group.

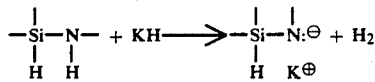

A pair of such functional groups join to each other to form a four-membered $Si_2N_2$ ring, permitting the metal hydride to be regenerated.

Upon the addition of methyl iodide ($CH_3I$) to the reaction system after the completion of the following reaction:

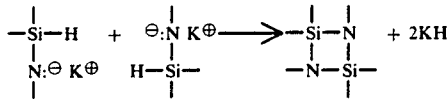

the amide functional group reacts with methyl iodide, forming potassium iodide precipitates.

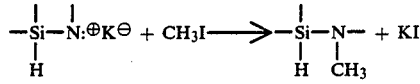

By centrifugally removing the potassium iodide precipitates and distilling away the solvent, there is obtained a polymer in the form of white powder. This polymer is found to have, for example, the following composition according to proton NMR and elemental analysis.

$(CH_3SiHNH)_{0.39}(CH_3SiHNCH_3)_{0.04}(CH_3SiN)_{0.57}$

This composition may be represented by the following model.

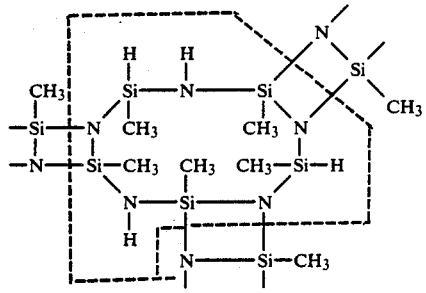

The structure enclosed by the broken line denotes the residue unit of the precursor.

Unfortunately, the above-mentioned process has some disadvantages. That is, when the precursor is polymerized in the presence of a metal hydride catalyst, the crosslinking reaction proceeds to such an extent that the polymer gels into an insoluble jelly. This makes it difficult to control the molecular weight and also makes the reaction less reproducible. Thus, the resulting polymer is unstable and becomes insoluble as the result of crosslinking which proceeds with time.

Therefore, it has poor storage properties. In addition, the polymerization reaction has to be carried out carefully at a low temperature (below 30° C.) because gelation takes place in a very short time if it is carried out at, say, 66° C. (the reflux temperature of tetrahydrofuran). The polymerization reaction takes a long time before a desired molecular weight is reached.

SUMMARY OF THE INVENTION

In order to overcome the above-mentioned disadvantages, the present inventors carried out research, which led to the findings that the disadvantages in the prior art arise from the fact that the precursor contains excessive crosslinking sites and that the number of crosslinking sites can be limited by proper means. The present invention was completed on the basis of these findings.

The first aspect of the present invention is concerned with a new polysilazane having the skeleton composed of the repeating units of the formula:

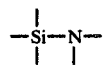

in which polysilazane, the precursor residues, each composed of the unit of the formula:

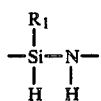
(A)

and the unit of the formula:

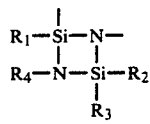
(B)

are connected to each other through a structural unit of the formula:

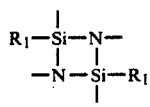
(C)

The second aspect of the present invention is concerned with a process for producing a polysilazane which comprises reacting anhydrous ammonia with an organodihalosilane ($R_1SiHX_2$) in a solution, thereby forming a cyclic or linear silazane precursor, reacting said silazane precursor coexistent with a silazane or silylamine compound represented by the formula:

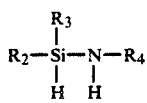

in the presence of a basic catalyst capable of deprotonating hydrogen from a nitrogen atom adjacent to a silicon atom, thereby performing polymerization through dehydrogenation, cyclization, and crosslinking.

In the above formulas, $R_1$, $R_2$, $R_3$ and $R_4$ each represents hydrogen (except for $R_4$, the same shall apply hereinafter), a lower alkyl group having 1 to 6 carbon atoms, a substituted or unsubstituted vinyl group, a substituted or unsubstituted allyl group, a substituted or unsubstituted lower aryl group having 6 to 10 carbon atoms, tri(lower)alkyl- or di(lower)alkyl-silyl group, and di(lower)alkylamino group (except for $R_4$ the same shall apply hereinafter), with $R_1$, $R_2$, $R_3$, and $R_4$ being the same or different from one another. X denotes a halogen such as chlorine and bromine.

The basic catalyst capable of deprotonating hydrogen from a nitrogen atom adjacent to a silicon atom in the precursor includes metal hydrides such as potassium hydride, sodium hydride, and lithium aluminum hydride ($LiAlH_4$), and metals such as lithium, sodium, and potassium.

DETAILED DESCRIPTION OF THE INVENTION

The new silazane of the present invention requires that a portion of the residues having the unit of the formula:

(A)

in the precursor be composed of the structural unit of the formula:

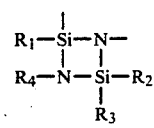
(B)

and a portion of the residues in the precursor be connected to each other through a structural unit of the formula:

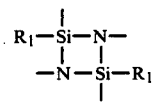
(C)

The content of the unit (B) in the polysilazane should preferably be 1 to 60 mol %.

The present invention produces the following effects.

(1) It is possible to produce the polymer having a desired molecular weight almost invariably by properly selecting the ratio of silazane or silylamine which coexists.

(2) The finished polymer changes very little with time, and hence it can be stored for a long time without gelation.

(3) The polymerization can be carried out without gelation even at the reflux temperature of tetrahydrofuran, and hence the polymerization time can be shortened.

The reason why the present invention produces the above-mentioned effect may be explained as follows: The precursor produced by ammonolysis of methyldichlorosilane according to the prior art is a cyclic compound which is composed of about 5 structural units of the formula:

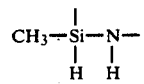

and has five crosslink reaction sites. If all of them take part in reaction, the reaction product is a crosslinked polymer having a three-dimensional network. Apparently, it is an insoluble gel. The compound should ideally be one which has two reaction sites, so that it forms a linear polymer through linkage. Such a polymer should be soluble and capable of spinning. The essential requirement for the reaction site is that a hydrogen atom be present at each adjoining silicon atom and nitrogen atom. In the case where a precursor produced from methyldichlorosilane is polymerized by deprotonation, a portion of the precursor residue represented by the formula:

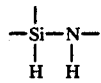

is reacted with tetramethyldisilazane (TMDS) of the formula:

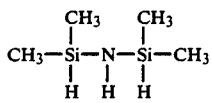

so that a unit of the formula:

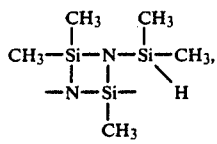

which does not have additional reaction sites is introduced into the skeletal structure. It follows, therefore, that the number of reaction sites can be controlled by adjusting the amount of TMDS to be added.

The invention is now described with reference to the following examples and comparative examples.

EXAMPLE 1

First step: In a 1-liter four-necked flask equipped with a stirrer, gas inlet tube, dry ice condenser, and thermometer, with the system completely dried and the atmosphere replaced with nitrogen, was placed 500 ml of tetrahydrofuran (THF) which had been freshly purified by distillation in the presence of lithium aluminum hydride (LiAlH$_4$). To the flask was added 115 g (1 mol) of methyldichlorosilane. After dissolution, the solution was bubbled with ammonia gas (dried by passing through a sodium hydroxide column) at a flow rate of 3 ml/min. During bubbling, the solution was stirred and kept at 35° C. Five hours later, the introduction of ammonia gas (ammonia 3.9 mol) was suspended. The solution was stirred overnight to expel excess ammonia. Ammonium chloride precipitates formed by the reaction were filtered off and THF was distilled away from the filtrate. Thus there was obtained a silazane oligomer precursor in a 90% yield (53 g). It was found to have a number-average molecular weight (Mn) of about 330 according to GPC. The number (n) of repeating units in the following formula was about 5.6.

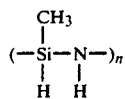

Second step: In a 500-ml three-necked flask equipped with a stirrer, dropping funnel, and condenser, was placed 100 mg (2.5 mmol) of potassium hydride (KH). With the system completely dried and the atmosphere replaced with nitrogen, 200 ml of tetrahydrofuran (THF) which had been freshly purified by distillation in the presence of lithium aluminum hydride was placed in the flask so that KH was suspended by stirring. To the flask was added dropwise from the dropping funnel a solution of 11.8 g (0.2 mol in terms of >SiH-NH- unit) of the silazane oligomer precursor obtained in the first step and a prescribed amount of tetramethyldisilazane as shown in the table below, both dissolved in 40 ml of THF. The dropwise addition was continued over about 30 minutes, with the solution temperature kept at 30° C. After the emission of hydrogen gas had stopped, stirring was continued for 20 hours. The reaction product was examined for molecular weight by GPC. The reaction product was also refluxed at 66° C. (the boiling point of THF) to see if gelation had taken place. The results are shown in the following table.

TABLE

| No. | TMDS g(mmol) | TMDS/precursor molar ratio(%) | Mn of polymer polymerized at 30° C. | Remarks |
|---|---|---|---|---|
| 1 | 16.0(120) | 60 | 770 | Liquid polymer |
| 2 | 5.3(40) | 20 | 1650 | Mn increased to 2600 after refluxing; no gelation |
| 3 | 4.0(30) | 15 | 2200 | Mn increased to 3400 after 300 hr at 30° C.; no gelation |
| 4 | 2.7(20) | 10 | 2300 | Mn increased to 4600 after refluxing, no gelation |
| 5 | 2.2(16.5) | 8.3 | 2720 | Mn increased to 5500 after 280 hr at 30° C.; no gelation |

EXAMPLE OF SPINNING

Each of the polysilazanes shown in the above table was quenched with methyl iodide and then stored for 30 days at room temperature. None of them changed in number-average molecular weight (Mn). The polysilazane in No. 5 (Mn: 5500) was easily spun into green fiber. This polysilazane was found to have good spinnability.

EXAMPLE 2

Fifteen grams (0.25 mol) of the silazane oligomer precursor obtained the first step in Example 1 was dissolved in 50 ml of THF, and the solution was added dropwise to 200 ml of THF solution containing 150 mg (3.7 mmol) of KH. Three hours later, the number-average molecular weight (Mn) reached 1790. Seven grams (50 mmol) of TMDS was added, and stirring was continued at 30° C. Twenty-one hours later, there was obtained a polymer having a number-average molecular weight (Mn) of 2400. According the result of gas chromatography, the consumption of TMDS was 40% and 83% 1 hour and 21 hours after addition, respectively.

Even after refluxing at 66° C (boiling point of THF) for 20 hours, the number-average molecular weight (Mn) remained at 2600 and no gelation took place. The solution was easily spun into green fiber. This polysilazane was found to have good spinnability.

EXAMPLE 3

In 40 ml of THF were dissolved 11.8 g (0.2 mol in terms of >SiH-NH- unit) of the silazane oligomer precursor obtained in the first step in Example 1 and 9.2 g (0.0335 mol) of diphenylsilylphenylamine, and the solution was added dropwise to 200 ml of THF solution containing 150 mg (3.7 mmol) of potassium hydride. One hour later, the number-average molecular weight (Mn) reached 850. Even after additional stirring for 45 hours, the number-average molecular weight (Mn) remained unchanged. According to the result of gas chromatography, the consumption of diphenylsilylphenylamine was 92% after 1 hour.

COMPARATIVE EXAMPLE

The silazane oligomer precursor (prepared in the first step of Example 1) was polymerized alone at 30° C. according to the second step of Example 1. Three hours later, the number-average molecular weight (Mn) reached 5000, and gelation took place after continued reaction for 16 hours. Also, three hours later, the solution was quenched with methyl iodide and stored for 10 days at room temperature. It was impossible to spin the solution on account of some insolubles which caused yarn breakages.

What is claimed is:

1. A polysilazane having the skeleton composed of the repeating units of the formula:

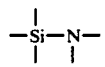

in which polysilazane, precursor residues, each composed of the unit of the formula:

 (A)

and the unit of the formula:

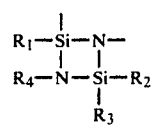 (B)

are connected to each other through a structural unit of the formula:

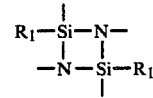 (C)

wherein $R_1$, $R_2$, $R_3$ and $R_4$ each represents a lower alkyl group having 1 to 6 carbon atoms, a substituted or unsubstituted vinyl group, a substituted or unsubstituted allyl group, a substituted or unsubstituted lower aryl group having 6 to 10 carbon atoms, tri(lower)alkyl- or di(lower)alkyl-silyl group, or di(lower)alkylamino group, with $R_1$, $R_2$, $R_3$, and $R_4$ being the same or different from one another.

2. A polysilazane as claimed in claim 1, wherein the content of the unit (B) in said polysilazane is 1–60 mol %.

3. A polysilazane as claimed in claim 1, wherein $R_1$, $R_2$, and $R_3$ in said each formula are all methyl group, and $R_4$ is dimethylsilyl group.

4. A process for producing a polysilazane which comprises:
   (a) reacting anhydrous ammonia with an organodihalosilane, $R_1SiHX_2$, in a solvent, thereby forming a cyclic or linear silazane precursor;
   (b) reacting said silazane precursor coexistent with a silazane or silylamine compound represented by the formula:

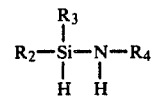

in the presence of a basic catalyst capable of deprotonating hydrogen from a nitrogen atom adjacent to a silicon atom, thereby performing polymerization through dehydrogenation, cyclization, and crosslinking, wherein $R_1$, $R_2$, $R_3$ and $R_4$ each represents a lower alkyl group having 1 to 6 carbon atoms, a substituted or unsubstituted vinyl group, a substituted or unsubstituted allyl group, a substituted or unsubstituted lower aryl group having 6 to 10 carbon atoms, tri(lower)alkyl- or di(lower)alkyl-silyl group, or di(lower)alkylamino group, with $R_1$, $R_2$, $R_3$, and $R_4$ being the same or different from one another.

5. A process for producing a polysilazane as claimed in claim 4, wherein the silazane or silylamine compound is used in an amount of 1 to 60 mol % calculated on the basis of a unit formula:

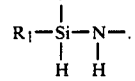

6. A process for producing a polysilazane as claimed in claim 4, wherein $R_1$, $R_2$, and $R_3$ in said each formula are all methyl group, and $R_4$ is dimethylsilyl group.

7. A process for producing a polysilazane as claimed in claim 4 wherein said silazane or silylamine compound comprises tetramethyldisilazane.

* * * * *